US005647169A

United States Patent [19]
Bui

[11] Patent Number: 5,647,169
[45] Date of Patent: Jul. 15, 1997

[54] PLANTER COLLAR

[76] Inventor: Dennis M. Bui, 6901 Spinel Ave., Alta Loma, Calif. 91701

[21] Appl. No.: 441,242

[22] Filed: May 15, 1995

[51] Int. Cl.⁶ .................................................. A01G 1/08
[52] U.S. Cl. ...................................... 47/78; 47/37
[58] Field of Search ............................ 47/33, 78 F, 66 B

[56] References Cited

U.S. PATENT DOCUMENTS

| | | | |
|---|---|---|---|
| 3,520,082 | 7/1970 | Smith | 47/33 |
| 3,896,587 | 7/1975 | Insalace | 47/66 R |
| 4,019,279 | 4/1977 | Moorman | 47/78 F |
| 4,809,460 | 3/1989 | Futch | 47/33 |
| 4,955,156 | 9/1990 | Williams | 47/78 F |
| 5,400,545 | 3/1995 | Medina | 47/78 F |
| 5,465,526 | 11/1995 | Langley | 47/78 F |

FOREIGN PATENT DOCUMENTS 2223921  4/1990  United Kingdom ............ 47/33

*Primary Examiner*—Henry E. Raduazo
*Attorney, Agent, or Firm*—Roger A. Marrs

[57] ABSTRACT

A collar or ring is disclosed herein for protecting and encouraging the growth of plants which includes a circular sidewall defining an open-ended cavity with a flanged handle at one end and a soil penetration edge at its other end. The flanged end is reinforced by the contour of the flange construction and/or integral ribs connecting the underside of the flange with the sidewall. A hole or groove may be provided in the flange to accommodate a watering device and the sidewall may incorporate straight or tapered sides or a combination thereof.

1 Claim, 1 Drawing Sheet

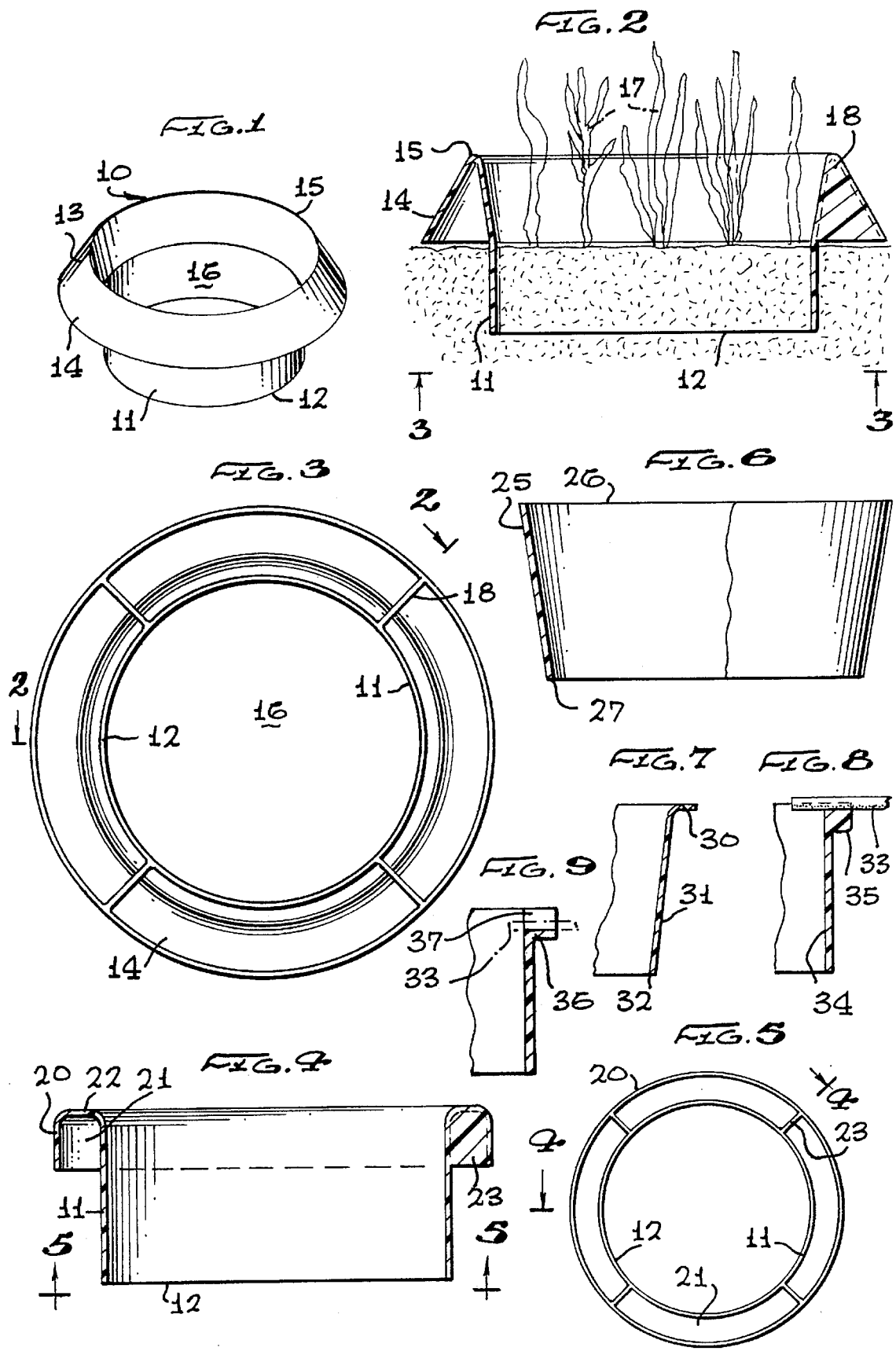

PLANTER COLLAR

BACKGROUND OF THE INVENTION

1. Field of the Invention

The present invention relates to the field of planters, and more particularly to a novel planter collar or ring having an open-ended cavity adapted to promote the growth of plants, and which further includes a handle means and a soil penetration means for partially burying the planter collar into soil surrounding a plant intended to be protected.

2. Brief Description of the Prior Art

In the past, it has been the conventional practice to provide as much protection to small or recently planted flowers and plants by providing collars or rings which will surround the plant during its formative growth period. Such water retaining rings are employed to conserve water and to prevent runoff. The collars or rings are helpful in controlling weed growth around the plant base as well.

Some attempts have been made to provide such protective devices which are represented in U.S. Pat. Nos. 5,090,155; 4,019,279 and 4,142,324. Although these prior attempts have been successful in providing limited protection to plants, difficulties and problems have arisen which stem largely from the fact that such devices employ bottoms such as in pots so that the root system cannot properly enter the ground and also from the fact that the burial or insertion of collars and rings into the soil is difficult. In other instances, the top opening to the collar or ring is confining so that exposure to oxygen is greatly limited. In other instances, the collar or ring is not free-standing and requires rods or other supporting structure to retain the collar or ring in place about a plant.

Therefore, a long-standing need has existed to provide a protection collar or ring for flowers and plants which not only prevents the ingrowth of weeds but also permits a friendly environment to exist about the immediate area of the flower or plant. Additionally, watering means should be available for providing moisture during the early growth of a plant. The collar or ring should include a means for pressing or inserting the ring into the soil about the flower or plant and should not include in its design protrusions or other obstacles which would restrict or make insertion into the ground difficult.

SUMMARY OF THE INVENTION

Accordingly, the above problems and difficulties are avoided by the present invention which provides a novel protective ring or collar which includes a circular sidewall defining an open-ended cavity or passageway permitting the sidewall to be placed about a flower or plant. One end of the sidewall is provided with an edge suitable for engaging and entering the soil with ease while the other end of the sidewall is provided with a flanged handle useful in imparting pressure to the sidewall in order to achieve insertion into the soil. The sidewall may be of a tapered configuration or a straight configuration or a combination thereof, and means are provided in the flanged handle for accommodating a water device discharging moisture into the center surrounding the plant. The sidewall is reinforced with the provision of flange configuration and/or the use of integral ribs joining the flange with the sidewall.

Therefore, it is among the primary objects of the present invention to provide a novel protective collar or ring suitable for insertion into the ground about the immediate vicinity of a plant or flower in order to prevent weeds, insects or other foreign matter from gathering around the base of the plant.

Another object of the present invention is to provide a novel protective collar for plants which may readily be inserted into the ground by means of a ground engaging edge on one end and a rounded handle at its other end suitable for manual application of pressure thereto.

Another object of the present invention is to provide a novel collar having a circular sidewall of either straight, tapered of combination thereof terminating in a ground engaging edge suitable for being forced into soil surrounding the plant and having an opposite edge at the top terminating in a rounded flange whereby manual pressure may be applied in order to effect insertion of the sidewall into the soil.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of the novel protective collar incorporating the present invention;

FIG. 2 is an enlarged transverse cross-sectional view of the collar as taken in the direction of arrows 2—2 of FIG. 3;

FIG. 3 is a bottom view of the protective collar shown in FIG. 2 as taken in the direction of arrows 3—3 thereof;

FIG. 4 is a transverse cross-sectional view of the collar illustrating another version;

FIG. 5 is a bottom view of the protective collar version shown in FIG. 4;

FIG. 6 is a view similar to the view of FIG. 4 illustrating another embodiment of the present invention;

FIG. 7 is a fragmentary sectional view showing still a further version of the invention;

FIGS. 8 and 9 are fragmentary sectional views showing means for accommodating watering devices in connection with the protective collar incorporating the present invention.

DESCRIPTION OF THE PREFERRED EMBODIMENT

Referring to FIG. 1, the novel planter protecting collar is illustrated in the general direction of arrow 10, which includes a circular sidewall 11 having a soil penetrating edge 12 and an opposite flanged end 13. Preferably, the flanged end 13 includes a downwardly depending flange 14 which is integrally formed with the upper edge of the sidewall 11 in a rounded configuration 15. Such a rounded integral joint is more clearly illustrated in FIG. 2 by numeral 15. It can be seen further in FIGS. 1 and 2 that the sidewall 11 defines an open-ended cavity with the edge 12 at one end and the flange end 13 at its opposite end. The integral cavity is broadly indicated by numeral 16 which is defined by the inner wall surface of sidewall 11.

As illustrated more clearly in FIG. 2, the flange 14 downwardly depends from its rounded junction with sidewall 11 as at numeral 15 so that the flange 14 may broadly be termed a handle against which manual pressure may be applied to insert the edge 12 of the sidewall 11 into surrounding soil about the plant 17. The protecting collar is rigidized by a plurality of ribs, such as rib 18 which outwardly radiate from the sidewall 11 to the underside of the flange 14. Such ribs are placed in fixed spaced-apart relationship, as illustrated in FIG. 3. Therefore, it can be seen that a substantial amount of manual pressure may be applied against the flanged edge of the sidewall to force the edge 12 into the soil. The edge 12 is unrestricted so that the user may press downwardly while slightly rotating in order to bury the lower half of the sidewall into the soil, as shown in FIG. 2.

The outwardly projecting and downwardly projecting flange 14 also serves as a stop when engaged with the surface of the soil so that insertion of the sidewall or the collar into the soil is terminated. Therefore, a substantial portion of the sidewall 11 is above the surface of the soil while the other portion of the sidewall is buried. It can also be seen in FIG. 2 that the lower portion of the sidewall 11 is straight while the upper portion of the sidewall outwardly diverges into the rounded joint 15. By this means, the underground portion or lower half of the sidewall is buried while the expanded diameter of the cavity resides above the surface of the soil so that increased oxygen is available for plant growth.

Referring now to FIG. 3, it can be seen that the sidewall 11 defines an open-ended cavity between its inner surfaces and that the flange 14 is reinforced by connection to the sidewall via ribs 18.

Referring now in detail to FIGS. 4 and 5, another version of the present invention is illustrated in which the flange is illustrated by numeral 20 and takes the form of a downwardly depending element 21 which is in parallel spaced-apart relationship with respect to the sidewall 11. By such a means, a joint 22 is provided between the flange and the upper edge of the sidewall which will accommodate imparting of a manual load to force the terminating edge 12 into the soil surrounding the plant or flower. As described previously, the flange 20 is supported and reinforced by ribs, such as rib 23. Therefore, when manual force is placed on the semi-rounded or flat joint 22, the sidewall 11 via its edge 12 is forced into the soil. As described previously, the sidewall 11 defines an open-ended cavity which surrounds the plants.

Referring now in detail to FIG. 6, another embodiment of the present invention is shown wherein the sidewall is indicated by numeral 25 and is tapered from its upper edge 26 to its bottom or lower edge 27. The edge 27 engages with the ground when pressure or force is applied to the upper edge 26. Should the ground be extremely hard, such as when a clay composition is encountered, a board or block of wood is placed against the edge 26 and by use of manual pressure thereagainst or by using a hand mallet, a force is applied to the sidewall forcing the edge 27 through the pan or caked surface of the ground. The sidewall 25 is distinct from the sidewall 11 in FIG. 2 which is partially straight and partially tapered, and from the sidewall 11 shown in FIG. 4 which is totally straight.

Referring now in detail to FIG. 7, another version is illustrated wherein a flange 30 is a wide flat member terminating at the top edge of the sidewall 31. The flatness of the flange 30 permits the user's hands, such as the palm of his hands, to be placed thereagainst to forcibly urge the edge 32 into the ground.

Referring now in detail to FIGS. 8 and 9, another version is illustrated which includes means for accommodating a water device such as a small hose or tube such as indicated by numeral 33. The tube is either inserted through an opening 34 in a flange 35 so that its discharge end is within the cavity defined by the circular sidewall. In another embodiment shown in FIG. 9, the flange 35 includes a groove into which the tube 33 is placed in releasable snap-lock position. The flange is indicated by numeral 36 while the groove is represented by numeral 37.

In view of the foregoing, it can be seen that the collar of the present invention can readily be inserted into the soil around and about a plant 17. An upper portion of the sidewall is exposed above the ground while a lower portion is inserted into the ground. Insertion is readily accommodated by applying pressure to the upper edge of the sidewall which may or may not be defined by a flange and the flange may be reinforced. Not only is the flange useful in inserting the lower end of the sidewall into the soil but removal of the sidewall is readily accomplished by gripping the flange and pulling upwardly to dislodge the sidewall from the soil.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A protective collar for a plant comprising:

a continuous sidewall defining an open-ended cavity between a top end and a bottom end;

said top end adapted to receive manual pressure applied to said sidewall for imparting a load force to said bottom end for forcible insertion into soil;

said bottom end having an unobstructed edge engageable with the soil;

said bottom end resides in the soil beneath the surface thereof;

said top end resides exposed above the soil;

an outwardly cantilevered and flared flange carried on said top end projecting from said sidewall in a diverging, sloping, tapered relationship with respect to said sidewall;

a joint integrally connecting said top end with said flared flange and said flared flange having a terminating edge in fixed spaced-apart relationship with respect to said sidewall;

said joint is selected from:
 a. rounded joint
 b. flat joint;

said flared flange downwardly depends from said joint;

a plurality of ribs integrally interconnecting said flared flange with said sidewall to reinforce and rigidize said top end; and said flared flange and said joint constitute a handle device for inserting said bottom end into soil and for manually removing said bottom end from said soil.

* * * * *